United States Patent

[11] 3,604,672

[72] Inventors Bengt H. Askesjo
 Sollentuna;
 Knut Inge Nyhlen, Malmo, both of, Sweden
[21] Appl. No. 783,909
[22] Filed Dec. 16, 1968
[45] Patented Sept. 14, 1971
[73] Assignee Aktiebolaget SKRIVRIT
 Sollentuna, Sweden

[54] SUSPENSION DEVICE FOR TEACHING AIDS AND THE LIKE
 3 Claims, 9 Drawing Figs.
[52] U.S. Cl. ....................................................... 248/324,
 35/54, 211/46
[51] Int. Cl. ...................................................... G09b 25/00
[50] Field of Search........................................... 248/317,
 323, 327, 324; 160/29, 345; 49/158; 40/83, 65;
 35/54; 16/87, 93

[56] References Cited
UNITED STATES PATENTS

| 294,254 | 2/1884 | Montgomery | 40/83 |
| 1,911,277 | 5/1933 | Helmer | 211/46 X |
| 2,008,115 | 7/1935 | Taylor | 211/46 |
| 2,812,067 | 11/1957 | Gussack | 211/46 |
| 2,905,806 | 9/1959 | Tunney | 248/323 UX |
| 2,975,904 | 3/1961 | Krebs et al. | 211/46 |

Primary Examiner—Roy D. Frazier
Assistant Examiner—J. Franklin Foss
Attorney—Larson, Taylor and Hinds ABSTRACT: A suspension arrangement for a teaching aid such as a roll map includes a series of elongate downwardly opening channels for slidably receiving a pair of support members which are spaced apart and interconnected by a rigid rod. The support members are adapted to detachably mount a support shaft or the like for the teaching aid. The teaching aid may be pivotably mounted for rotation with respect to the channels so that the angular position of the teaching aid may be varied.

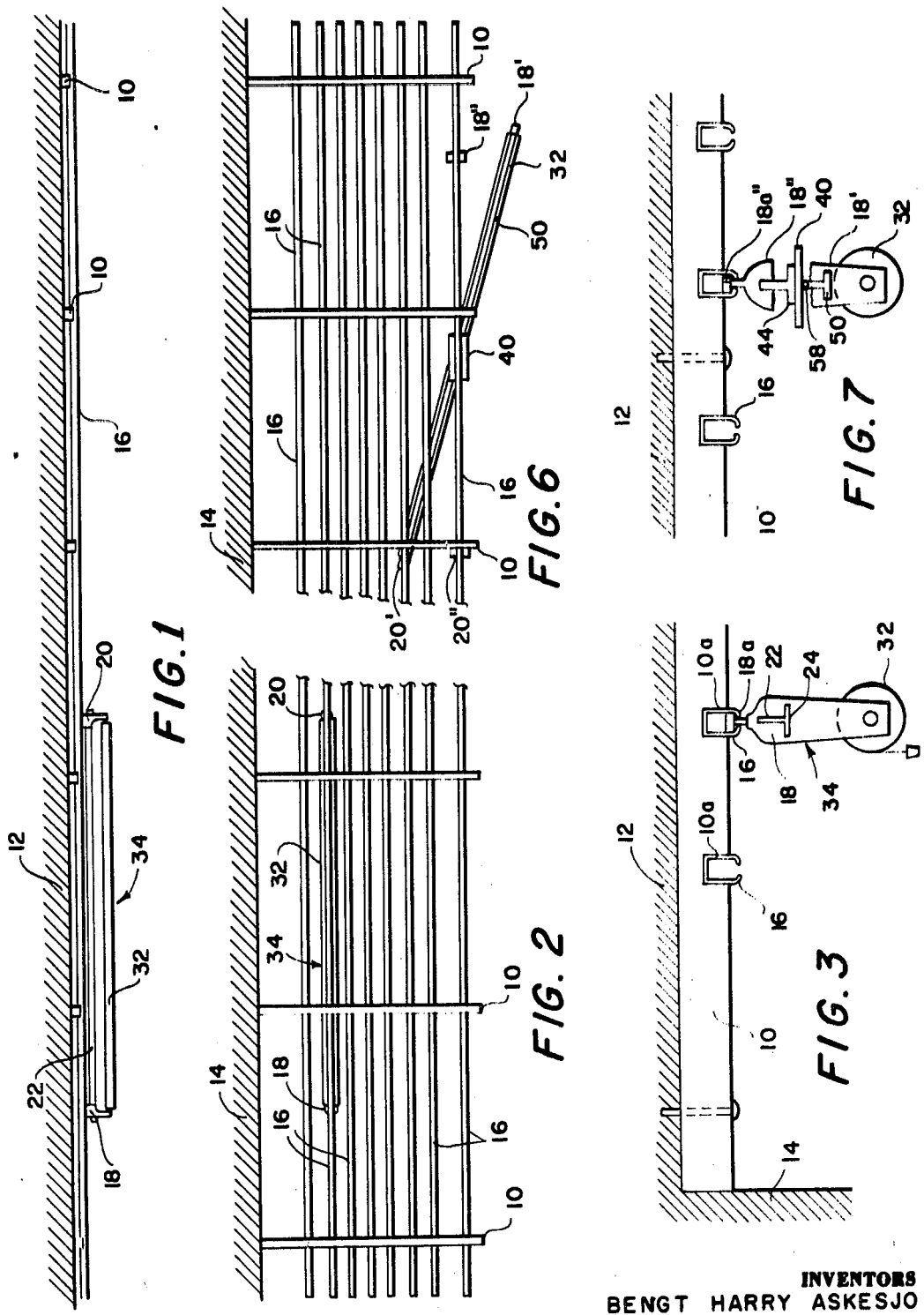

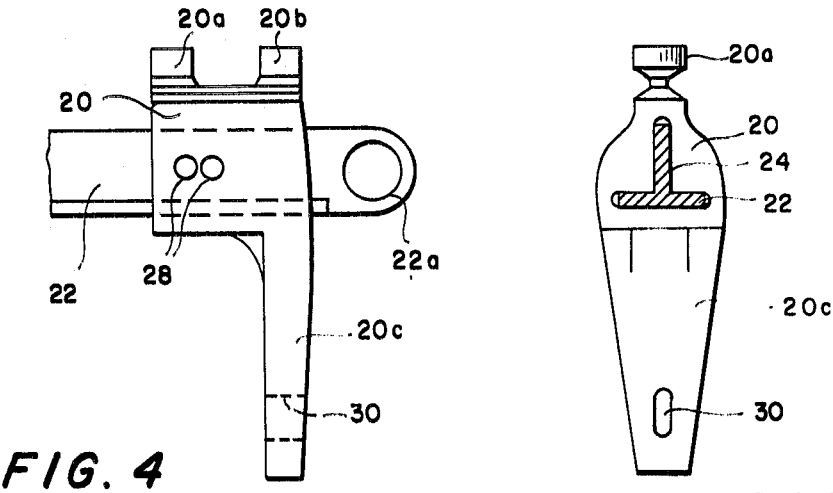
FIG. 4
FIG. 5
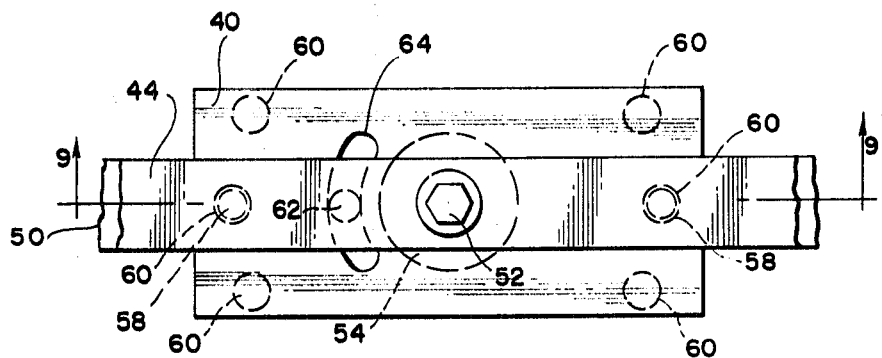
FIG. 8
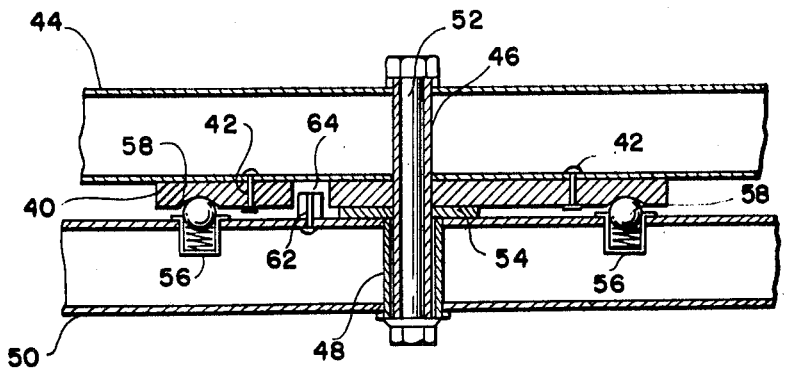
FIG. 9

3,604,672

SUSPENSION DEVICE FOR TEACHING AIDS AND THE LIKE

BACKGROUND OF THE INVENTION

1. Field of the Invention

The present invention relates to a suspension device for teaching aids such as screens for motion pictures and slides, wall maps and the like.

2. The Prior Art

In general, suspending teaching aids such as maps, screens and the like from the ceiling or wall of the room has been accomplished through the use of bars adapted to be secured to the ceiling or wall and to support a series of sliding members from which the teaching aid is suspended. Such arrangements are similar to those by which drapery is movably suspended. These arrangements have a number of disadvantages among which are the difficulty in maintaining a predetermined spacing between the sliding members, which spacing tends to alter while the object is being hung up, and the general ineffective and unsteady support provided for the object. Further, such arrangements do not permit the plane of the object to be rotated to a desired position or angular setting with regard to the student.

SUMMARY OF THE INVENTION

In accordance with the present invention a suspension device is provided wherein the disadvantages of the prior art are overcome. In accordance with a presently preferred embodiment of the invention a suspension device is provided which includes at least one elongate supporting member preferably in the form of a downward-opening channel and first and second members displaceable along the length of the supporting channel. A rod member is provided for interconnecting the displaceable members and for maintaining a preselected spacing therebetween. The displaceable members carry means for supporting a teaching aid such as a wall map or the like which means may merely comprise an aperture or recess in a lower portion of each of the displaceable members for receiving the supporting pins for the shaft on which the wall map is wound.

In accordance with another important feature of the invention the suspension device is constructed such that the plane of the teaching aid may be rotated to permit better viewing thereof by the student or to enable the student to better hear the instructor by improving the acoustical relationship between the instructor and student.

Other features and advantages of the present invention will be described in or apparent from the detailed description of the preferred embodiments found hereinbelow.

BRIEF DESCRIPTION OF THE DRAWINGS

FIG. 1 is a side elevational view of a suspension device in accordance with a first presently preferred embodiment of the invention;

FIG. 2 is a top view of the suspension device of FIG. 1;

FIG. 3 is an end view of the suspension device of FIG. 1 drawn to an enlarged scale;

FIGS. 4 and 5 are side and end detail views, respectively, of the sliding supporting members of FIG. 1;

FIG. 6 is a top view similar to that shown in FIG. 2 of a second presently preferred embodiment of the invention, the suspended object being shown rotated with respect to the supporting structure;

FIG. 7 is an end view, partially broken away and similar to that shown in FIG. 3, of the embodiment of FIG. 6, the suspended object being shown in alignment with the supporting structure;

FIG. 8 is a top detail view of a portion of the embodiment of FIG. 6; and

FIG. 9 is a longitudinal sectional view taken generally along line 9—9 of FIG. 8.

DESCRIPTION OF THE PREFERRED EMBODIMENTS

Referring to FIGS. 1 to 3, there is shown a series of parallel elongate wood strips or lists 10 which are affixed to the ceiling 12 adjacent a wall 14. A series of supporting bars in the form of downwardly opening channels 16 are arranged transversely to strips 10 in recesses 10a formed therein. Channels 16, which are rigidly affixed to strips 10 by suitable means, include inwardly directed longitudinal edges adapted to receive and support first and second slidably displaceable members 18 and 20. Members 18 and 20 are interconnected and spaced a predetermined distance apart by means of a T-profiled connecting rod 22.

Referring to FIGS. 4 and 5, the details of construction of displaceable member 20 are shown, it being appreciated that member 18 is similarly constructed. Member 20 includes first and second spaced head portions 20a and 20b adapted to engage in the recess formed by the inwardly directed longitudinal edges of channels 16, the lower edges of the head portions resting against and being supported by the longitudinal edges of the channel 16. A T-shaped slot 24 in the body portion of member 20 is adapted to receive the correspondingly shaped connecting rod 22. The position of member 20 along connecting rod 22 may be fixed by locking means 28 which may, for example, comprise first and second setscrews as shown in FIG. 4. A downwardly depending arm 20c of member 20 includes an aperture 30 for receiving the end support pin (not shown) of a roll-type teaching aid. The shapes of the apertures in displaceable members 18 and 20 are preferably different, one rectangular in cross section and one circular in cross section, so that they may accommodate the two differently shaped end pins commonly encountered in roll-type teaching aids.

Referring again to FIGS. 1 to 3, a roll-type teaching aid 32 is supported between displaceable members 18 and 20. In operation, the entire arrangement including members 18 and 20, connecting rod 22 and teaching aid 32 forms a carriage denoted 34 displaceable along channel 16. This displacement may, for example, be effected by hooking a hook member mounted on a wooden shaft in an ear 22a (see Fig. 4) to thus permit the instructor to move teaching air 32 along channel 16 to a suitable position for viewing by the students. It will be appreciated that the entire carriage device 34 can be mounted in any of the channels 16, that one or more of the devices 34 can be mounted within a single channel 16, and that a number of the devices 34 may be mounted in any of the various channels.

Referring to FIGS. 6 to 9, the embodiment shown permits rotation of the teaching aid with respect to the supporting structure. It will be appreciated that for the embodiment of FIGS. 1 to 5 discussed hereinabove a map or the like supported by the suspension device will hang with the plane thereof parallel to the longitudinal axis of the supporting channels 16. The embodiment now to be described permits rotation of the plane of the teaching aid with respect to the channels 16 so that, among other advantages, the viewing angle thereof may be varied with respect to the positions of the students. Except as noted hereinbelow the embodiment of FIGS. 6 to 9 is substantially similar to that of FIGS. 1 to 5 and similar elements have been given like reference numerals.

Referring to FIGS. 8 and 9, a guide plate 40 is affixed by suitable means such as rivets 42 to an upper rod or bar 44. A sleeve 46 extends through bar 44 and plate 40 to provide a shaft on which is journaled a bearing bushing 48 of a lower support bar 50. A bolt 52 extends through sleeve 46 and serves in retaining bushing 48 in position. A generally circular disc 54 is located in a gap between plate 40 and lower support bar 50. Lower support bar 50 includes first and second recesses 56 located on opposite sides of the bushing 48 as shown. Recesses 56 are adapted to receive spring-loaded ball members 58 which engage in a series of arcuately arranged recesses 60 in the undersurface of guide plate 40. Ball members 58 and recesses 60 cooperate to define a detenting arrangement by which the angular position of lower bar member 50 may be fixed with respect to upper bar member 44. Lower support bar 50 further includes an upwardly extending pin 62 which is adapted to engage in an arcuate slot 64 in guide plate 40. Slot 64 determines the limits of rotation of lower support bar 50 with respect to upper support bar 44.

Lower support bar 50 may correspond to connecting rod 22 of the embodiment discussed hereinabove, that is, bar 50 may be generally T-shaped in cross section and, as shown in FIG. 6, may carry first and second support members 18' and 20' (member 18' being shown partially broken away in FIG. 7) corresponding to members 18 and 20 of FIG. 1. Members 18' and 20' are correspondingly adapted to support a teaching aid 32. It will be appreciated that the spaced supporting heads of members 18 and 20 may be omitted regarding members 18' and 20' in that no purpose is served thereby in this embodiment.

Upper support bar 44 may also be of a form corresponding to connecting rod 22 of FIGS. 1 to 5 or may be rigidly attached to such a bar. As shown in FIG. 6, third and fourth supporting members 18" and 20", again corresponding to members 18 and 20 of FIG. 1, are slidably displaceable along channel 16 and, as shown in FIG. 7, are adapted to support upper support bar 44 therebetween. Member 18" which is shown partially broken away in FIG. 7 includes spaced supporting heads (only supporting head 18a" being shown in FIG. 7) for engaging in the recess formed by channel 16. Thus the embodiment shown in FIGS. 6 to 9 provides longitudinal displacement of teaching aid 32 along channels 16 as well as permits rotation of teaching aid 32 with respect to channels 16 so that teaching aid 32 may be selectively oriented.

It will be understood that by "teaching aids" is meant roll-type devices such as roll maps and screens for motion and still projection as well as other materials adapted to be suspended from the ceiling or the wall and that for devices of the latter type an arrangement different from the arrangement including recesses 30 described hereinabove (such as hooks or claws) may be utilized in supporting the teaching aid.

The sliding members and guide plates described hereinabove may be constructed of compression-moulded nylon whereas the bars and rods may be constructed of aluminum with suitably treated surfaces. It will be appreciated that these materials are merely exemplary and may be varied along with other specific features of the embodiments described above without departing from the scope and spirit of the invention. For example, the profile of the supporting bars may be different from the U-shaped channels 16 shown. Additionally, the wooden strips 10 need not be directly affixed to the ceiling but may in fact be located some distance thereunder particularly where the ceiling is not quite horizontal. Thus although the invention has been described with reference to particular preferred embodiments thereof it will be understood that other variations and modifications can be effected within the scope and spirit of the invention as described hereinabove and as defined in the appended claims.

We claim:

1. A suspension device for a roll-type teaching aid comprising at least one elongate, generally U-shaped supporting member adapted to be secured to the surface from which the teaching aid is to be suspended, first and second support devices spaced apart along and displaceable along the length of said supporting member, means including an elongate rodlike connecting member extending through slots in said first and second support devices for interconnecting said first and second support devices and for maintaining said first and second support devices in a spaced-apart relationship, said first and second support devices each including an upwardly extending portion engageable in said supporting member and a downwardly depending arm including an aperture therein for receiving an end pin of a roll-type teaching aid.

2. A suspension device as claimed in claim 1 further comprising a further, upper, elongate, rodlike member and mounting means for rotatably mounting said elongate connecting member with respect to said further elongate member, said support devices each comprising a first section secured to the further elongate member and engageable in said supporting member, said further elongate member serving to maintain said first sections of said first and second support devices in spaced relationship, and a second, separate portion secured to said elongate connecting member and including said downwardly depending arm, said elongate connecting member serving to maintain said second section of said first and second support devices in spaced relationship, and said mounting means including guide means for guiding the rotation of said elongate connecting member and stop means for limiting the rotation of said elongate connecting member.

3. A suspension device as claimed in claim 2 wherein said guide means comprises a plate member including recessed detents therein for cooperating with a spring-biased ball member mounted on said elongate connecting member to determine the angular position of said elongate connecting member with respect to said further elongate member, and said stop means comprises a stop pin mounted on said elongate connecting member and a control slot in said plate member for receiving said stop pin.